(12) United States Patent
Dande et al.

(10) Patent No.: US 11,784,991 B2
(45) Date of Patent: Oct. 10, 2023

(54) CONTACTLESS AUTHENTICATION AND EVENT PROCESSING

(71) Applicant: Bank of America Corporation, Charlotte, NC (US)

(72) Inventors: Pratap Dande, Saint Johns, FL (US); Siten Sanghvi, Westfield, NJ (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 423 days.

(21) Appl. No.: 16/933,302

(22) Filed: Jul. 20, 2020

(65) Prior Publication Data
US 2022/0021666 A1    Jan. 20, 2022

(51) Int. Cl.
*H04L 9/40* (2022.01)
(52) U.S. Cl.
CPC .................................. *H04L 63/08* (2013.01)
(58) Field of Classification Search
CPC ... H04L 63/18; H04L 63/083; H04L 63/0853; H04L 63/0838; H04L 63/08; H04L 63/0861
USPC ............................................................ 726/5
See application file for complete search history.

(56) References Cited

U.S. PATENT DOCUMENTS

| | | | |
|---|---|---|---|
| 7,641,111 B2 | 1/2010 | Adams et al. | |
| 8,511,547 B2 | 8/2013 | Rans et al. | |
| 8,533,123 B2 | 9/2013 | Hart | |
| 8,640,950 B2 | 2/2014 | Adams et al. | |
| 2010/0277278 A1 | 11/2010 | Courouble et al. | |
| 2015/0163220 A1 | 6/2015 | Gaston | |
| 2017/0118025 A1* | 4/2017 | Shastri | ................. H04L 9/3231 |
| 2018/0357645 A1* | 12/2018 | Caution | ................... G10L 15/22 |
| 2020/0356998 A1* | 11/2020 | Singh | ..................... G06Q 20/12 |
| 2022/0129903 A1* | 4/2022 | Sambhar | ........... G06Q 20/40145 |

* cited by examiner

*Primary Examiner* — Benjamin A Kaplan
(74) *Attorney, Agent, or Firm* — Banner & Witcoff, Ltd.

(57) ABSTRACT

Systems for contactless authentication and event processing are provided. In some examples, a user may request processing of an event. The user may provide user identifying or event identifying information that may be transmitted to contactless processing computing platform. Based on the user identifying information, additional user data may be retrieved. An interactive authentication request may be generated and transmitted to the user computing device. The interactive authentication request may include a request for one or more types of authentication data. The user may input authentication response data into the user computing device, which may then be transmitted to the contactless processing computing platform for evaluation. The authentication response data may be evaluated to determine whether it includes a trigger, whether it matches pre-stored authentication data, and the like. In response, one or more authentication outputs may be generated and/or the requested event may be processed or denied.

21 Claims, 11 Drawing Sheets

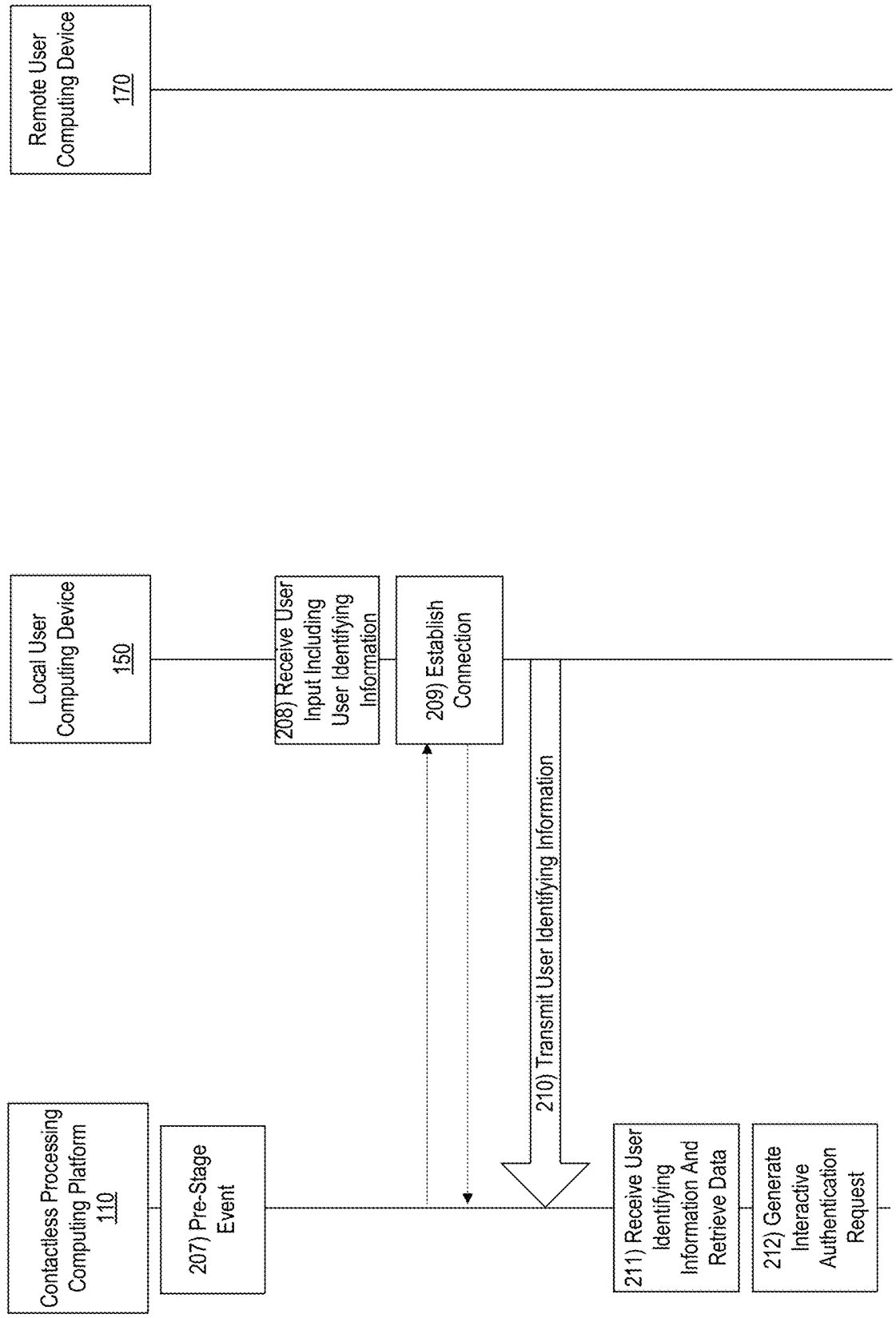

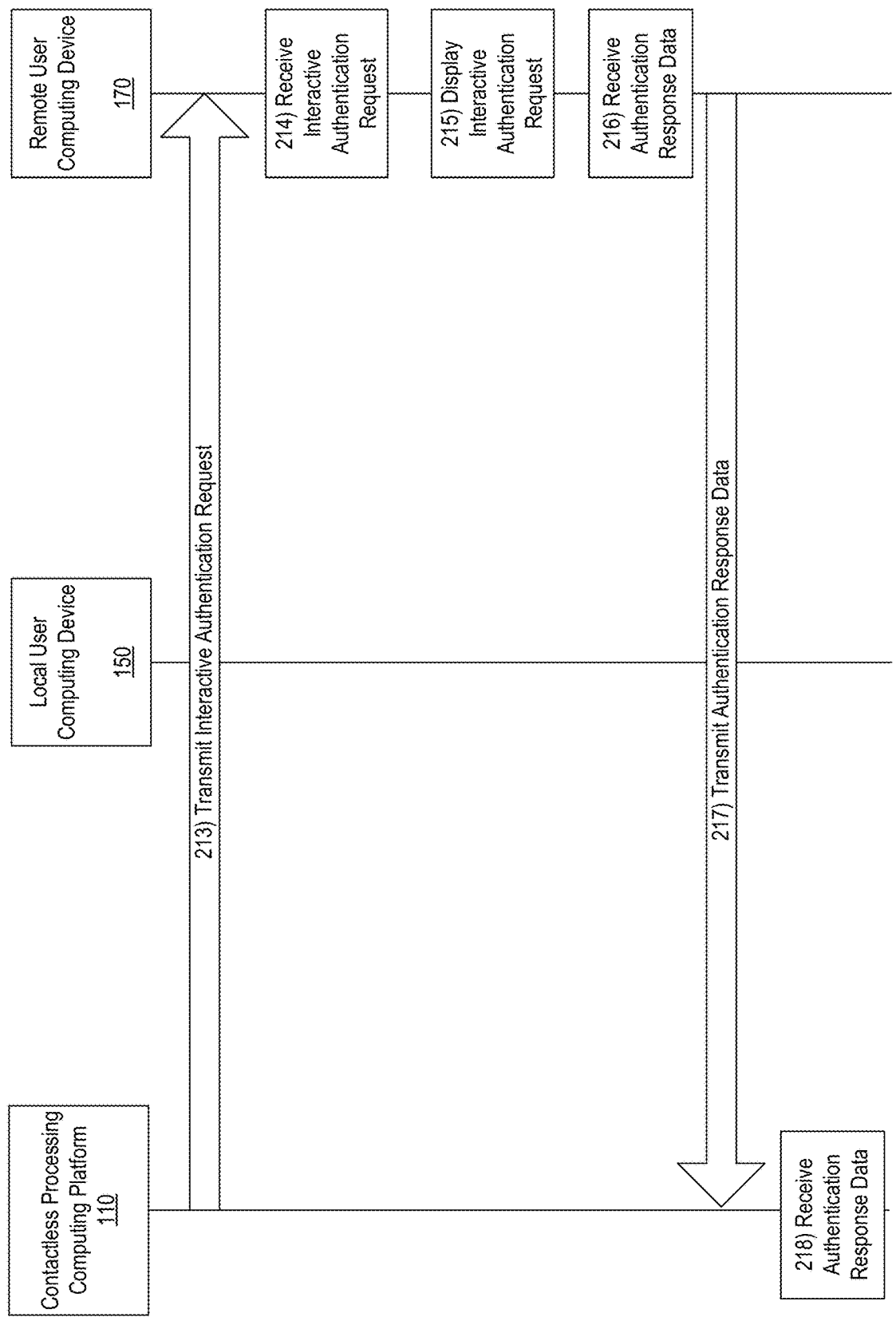

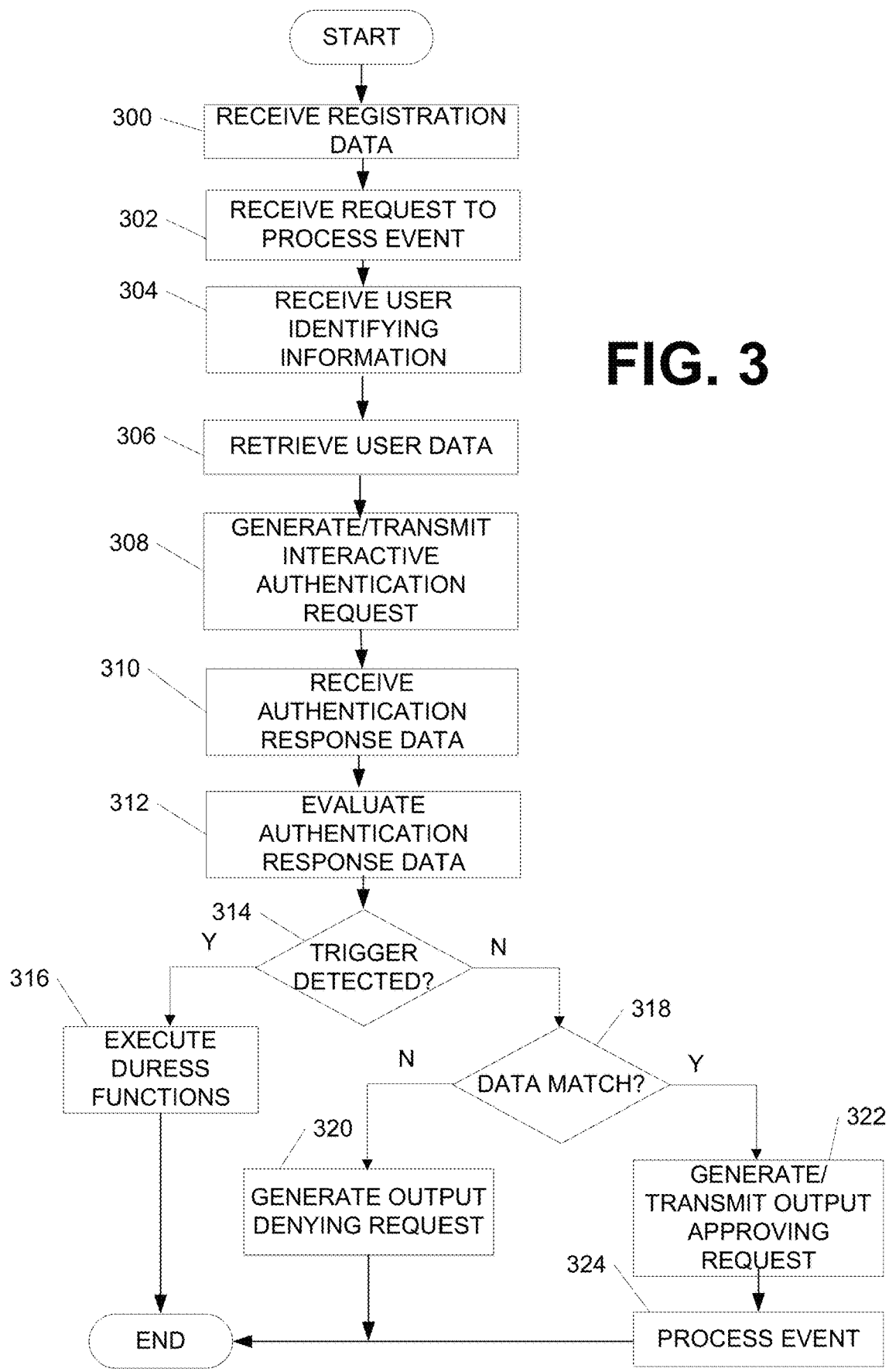

CONTACTLESS AUTHENTICATION AND EVENT PROCESSING

BACKGROUND

Aspects of the disclosure relate to electrical computers, systems, and devices performing contactless authentication and event processing.

As customers become more aware of hygiene issues as they go about their daily routines, many customers want to avoid touching surfaces in public areas as much as possible. Accordingly, authenticating a user and/or processing events while minimizing or eliminating contact with common surfaces is important. In some conventional systems, a user may be requested to input authenticating data, provide a signature, or the like, via a touchscreen, keypad, stylus, or the like, that is a common surface and may be contacted by hundreds or thousands of customers per day. Accordingly, arrangements discussed herein are directed to reducing or eliminating the need to contact one or more surfaces when authenticating a user and/or processing events/

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated authenticating a user or processing an event while minimizing or eliminating user contact with the self-service kiosk.

In some examples, a user may request processing of an event. The request may be received via a user computing device or an entity computing device, such as a computing device associated with a delivery associate, banking associate, or the like. In some examples, the event may be pre-staged based on the request.

The user may provide user identifying or event identifying information. For instance, the user may tell a banking associate or delivery associate his or her name, unique identifier, event identifier, or the like. The associate may input the data into his or her entity computing device and it may be received by contactless processing computing platform. Based on the user identifying information, additional user data such as device data, account data, authentication data, and the like, may be retrieved.

In some examples, an interactive authentication data request may be transmitted to the user computing device. The interactive authentication data request may include a request for one or more types of authentication data. The user may input authentication response data into the user computing device, which may then be transmitted to the contactless processing computing platform for evaluation.

The authentication response data may be evaluated to determine whether it includes a trigger, whether it matches pre-stored authentication data, and the like. In response, one or more authentication outputs may be generated and/or the requested event may be processed or denied.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing contactless authentication and event processing functions in accordance with one or more aspects described herein;

FIG. 3 depicts an illustrative method for implementing and using contactless authentication and event processing functions according to one or more aspects described herein;

DETAILED DESCRIPTION

Figure 1A:
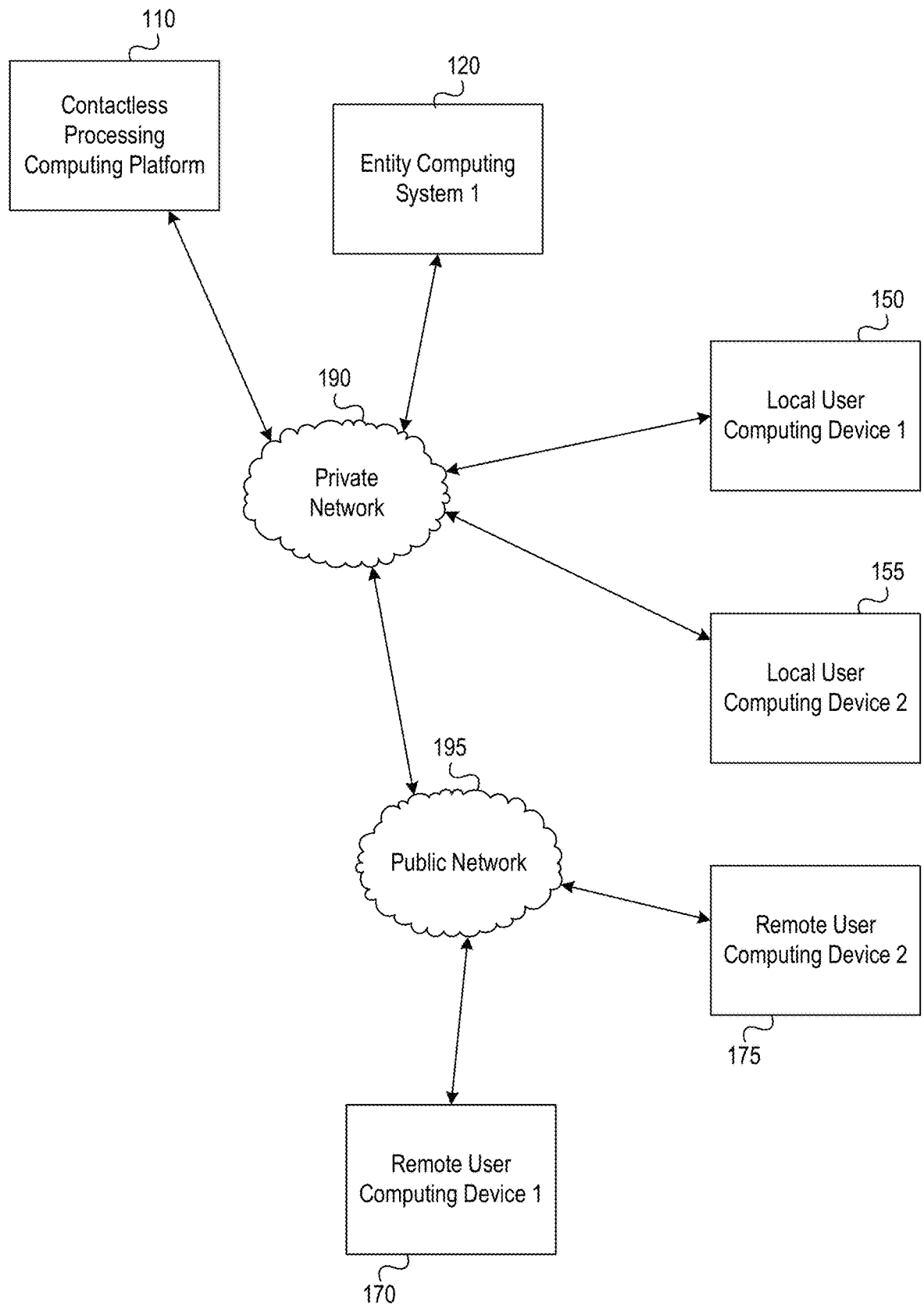
FIGS. 1A and 1B depict an illustrative computing environment for implementing contactless authentication and event processing functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, reducing or eliminating contact with common or public surfaces is an important consideration as people continue to focus on hygiene. In addition, ensuring user data security is of significant importance to users and entities protecting customer data. Accordingly, arrangements described herein provide enhanced authentication processes that may be contactless (e.g., reduce or minimize contact with common or public surfaces) while maintaining data security of the user.

In some examples, a user may request processing of an event, such as a withdrawal, deposit, delivery of funds (e.g., domestic or foreign), delivery of a purchased product or service, or the like. In order to complete processing of the event and ensure data security, the user may be authenticated prior to processing the transaction. In some examples, this may be a person-to-person authentication process (e.g., user to banking associate, user to delivery associate, or the like). Accordingly, the user may provide his or her identifying information (e.g., name, unique identifier, event identifier, or the like) to the associate who may then transmit the data to a contactless processing computing platform. The contactless processing computing platform may retrieve user data, such as pre-stored data, including, for example, account data, authentication data, user preference data, user device data, or the like.

In some examples, contactless processing computing platform may generate an interactive authentication data request that may be transmitted to a user computing device. The user may input authentication response data via the user computing device (e.g., without contact with common or public surfaces or devices) which may be transmitted to contactless processing computing platform 110 for evaluation.

In some examples, the authentication response data may be evaluated to determine whether a trigger is present. If so, additional functions may be executed. The authentication response data may be further evaluated to determine whether it matches pre-stored authentication data. Based on the evaluation of the authentication response data, one or more authentication outputs and/or notifications may be generated and transmitted for display on one or more computing devices.

These and various other arrangements will be discussed more fully below.

Figure 1B:
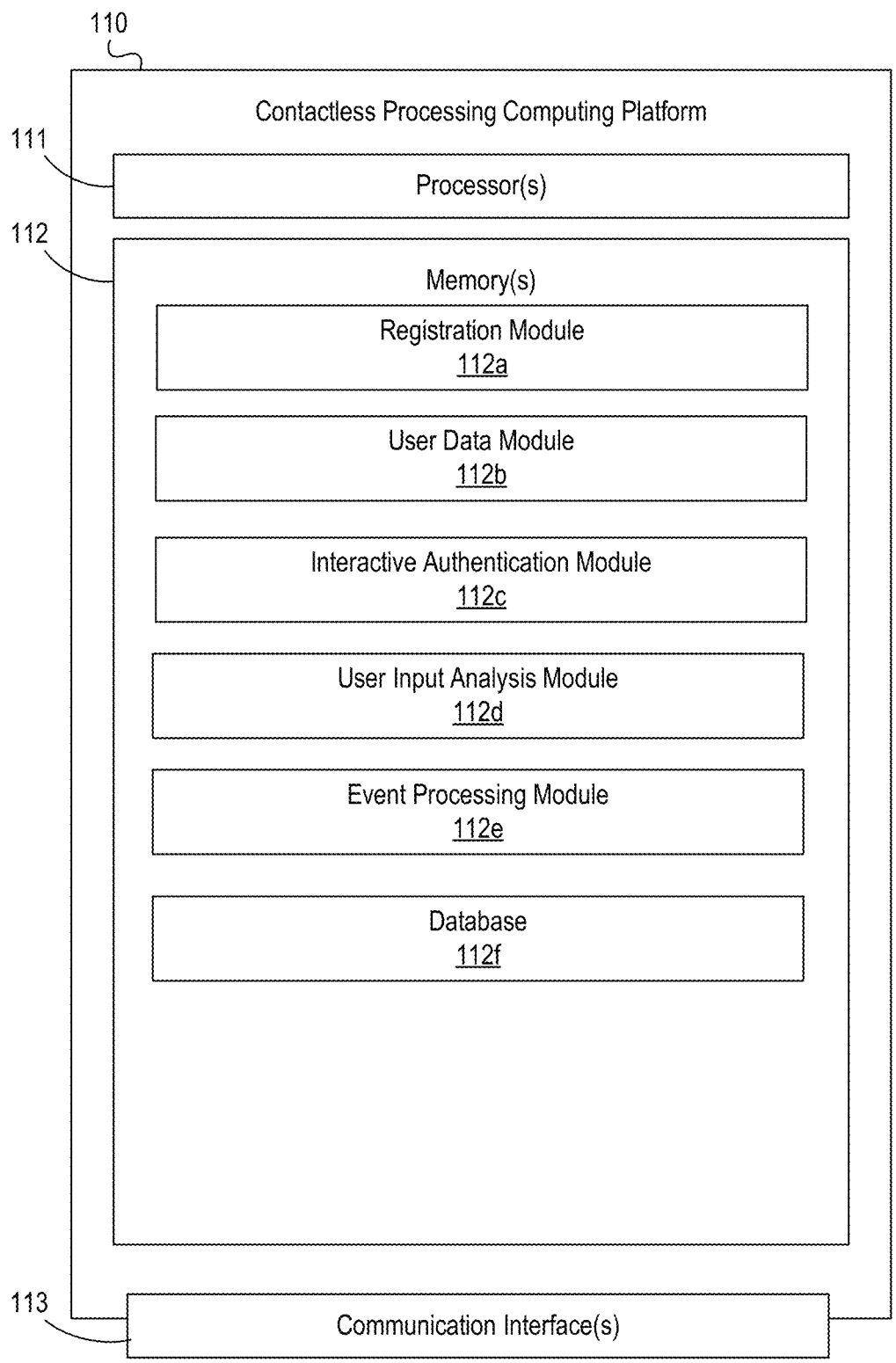

FIGS. 1A-1B depict an illustrative computing environment for implementing and using a system for contactless authentication and event processing in accordance with one or more aspects described herein. Referring to FIG. 1A, computing environment 100 may include one or more computing devices and/or other computing systems. For example, computing environment 100 may include contactless processing computing platform 110, entity computing system 120, a first local user computing device 150, a second local user computing device 155, a first remote user computing device 170, and a second remote user computing device 175. Although two local user computing devices 150, 155 and two remote user computing device 170, 175 are shown, more or fewer devices may be used without departing from the invention.

Contactless processing computing platform 110 may be configured to provide intelligent, dynamic, contactless authentication and event processing functions. For instance, contactless processing computing platform 110 may receive registration information from one or more users. In some examples, registration information may include user identifying information, device identifying information (e.g., user computing device), authentication information of the user, user preferences (e.g., request for contactless authentication and event processing, criteria for using contactless authentication and event processing, trigger settings, or the like), and the like. The registration data may be stored in, for example, a database.

In some examples, a user may request processing of an event. For instance, a user may enter a banking center and request processing an event, such as a transaction (e.g., withdrawal, deposit, or the like) from a banking associate. In some arrangements, a user may pre-stage an event via an online application, mobile application executing on the user computing device, or the like. Pre-staging the event may include requesting the event, providing one or more parameters associated with the event, and the like, from a first location and then proceeding to a second, different location to complete processing of the event. For example, a user may pre-stage an event to withdraw $200 by requesting the withdrawal via an online or mobile banking application, may input parameters such as an amount of the withdrawal, requested time of completion and the like. The user may then proceed from the first location at which the pre-staging was performed (e.g., home, office, or the like) to a second location, such as a financial institution location. Upon arrival at the financial institution location, the user may be authenticated (as will be discussed more fully herein) and the event may be processed (e.g., the user may receive the requested withdrawal amount of $200).

Although an example withdrawal event is described above, and the second location is described as a financial institution location, in some examples, events may include delivery of funds (e.g., to a user home, office or the like), delivery of foreign currency, and the like. Further, arrangements discussed herein may be used to authenticate users in areas other than financial services, such as delivery of products where authentication may be desired, and the like.

If a user requests an event at a particular location (e.g., financial institution location, delivery location, or the like), or if a user has pre-staged an event and is looking to the complete the event, the user may be authenticated prior to processing the event. Accordingly, a user may provide, e.g., to a banking associate, delivery associate, or the like, user identifying information, such as a name, order number, or the like. In some examples, the user may tell his or her name or identifying information to the associate. The user may input the user identifying information into a local user computing device associated with the associate. The identifying information may be used as input in a query to retrieve user information.

In some examples, the user information may be retrieved from a database. The user information may include user device identifying information, pre-stored authentication information, and the like. Based on the request for event processing and/or authentication, the contactless processing computing platform 110 may generate an interactive authentication data request. The interactive authentication data request may include a request for a username and password combination, single use code, personal identification number (PIN), biometric data (e.g., fingerprint, voiceprint, iris scan, facial recognition, or the like), or the like. Based on the retrieved data, the request for authentication information may be transmitted to a user computing device, such as a mobile device of the user. The user may then provide authentication response data via the mobile device to avoid contact with common surfaces, such as a keypad, stylus, or the like.

The authentication response data may be transmitted from the mobile device of the user to the contactless processing computing platform 110 and may be compared to pre-stored data (e.g., retrieved from the database). If the data matches, the user may be authenticated and the event may be processed. If the data does not match, additional authentication may be requested, the event processing request may be denied or the like.

Entity computing system 120 may be a computing device associated with the entity or enterprise organization implementing the contactless processing computing platform 110. For instance, entity computing system 120 may be one or more devices or systems that may host or execute a mobile or online applications, applications and systems for processing events (e.g., withdrawals, deposits, or the like), applications and systems for managing user accounts, and the like. Accordingly, entity computing system 120 may facilitate processing of an event (e.g., based on instructions or commands generated by contactless processing computing platform 110).

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the contactless processing computing platform 110, entity computing system 120, or the like to request event processing, input user or event identifying information, process events, and the like. Local user computing device 150, 155 may include a computing device associated with the entity and with an associate of the entity (e.g., a banking associate, a delivery associate, or the like).

The remote user computing device 170 and remote user computing device 175 may be user devices, such a mobile device, smartphone, wearable device, tablet computer, or the like. Remote user computing device 170 and/or remote user computing device 175 may be used to pre-stage events, request event processing, display authentication data requests, receive authentication response data, and the like.

Computing environment 100 also may include one or more computing platforms. For example, and as noted above, computing environment 100 may include contactless processing computing platform 110. As illustrated in greater detail below, contactless processing computing platform 110 may include one or more computing devices configured to perform one or more of the functions described herein. For example, contactless processing computing platform 110 may include one or more computers (e.g., laptop computers, desktop computers, servers, server blades, or the like).

As mentioned above, computing environment 100 also may include one or more networks, which may interconnect one or more of contactless processing computing platform 110, entity computing system 120, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, contactless processing computing platform 110, entity computing system 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect contactless processing computing platform 110, entity computing system 120, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., contactless processing computing platform 110, entity computing system 120, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., contactless processing computing platform 110, entity computing system 120, local user computing device 150, local user computing device 155).

Referring to FIG. 1B, contactless processing computing platform 110 may include one or more processors 111, memory 112, and communication interface 113. A data bus may interconnect processor(s) 111, memory 112, and communication interface 113. Communication interface 113 may be a network interface configured to support communication between contactless processing computing platform 110 and one or more networks (e.g., private network 190, public network 195, or the like). Memory 112 may include one or more program modules having instructions that when executed by processor(s) 111 cause contactless processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of contactless processing computing platform 110 and/or by different computing devices that may form and/or otherwise make up contactless processing computing platform 110.

For example, memory 112 may have, store and/or include a registration module 112a. Registration module 112a may store instructions and/or data that may cause or enable the contactless processing computing platform 110 to receive data related to one or more users and/or user devices, accounts or the like. In some examples, registration module 112a may receive other registration data such as user options to enable contactless processing. In some arrangements, authentication data (e.g., biometric data, device data, username and password data, PIN, or the like) may be provided via the registration module 112a and pre-stored for later comparison to received authentication data. The registration module 112a may, upon receiving registration data, modify a database to store the registration data in a new entry. In some examples, registration module 112a may, with permission of the user, retrieve data related to the user from one or more other entity devices or systems (e.g., pre-stored account data, authentication data, or the like), such as entity computing system 120.

Contactless processing computing platform 110 may further have, store and/or include user data module 112b. User data module 112b may store instructions and/or data that may cause or enable the contactless processing computing platform 110 to receive user identifying information from, for example, local user computing device 150, local user computing device 155, or the like. For instance, a user may provide his or her identifying information (e.g., name, event identifier, or the like) to a banking associate (e.g., the user may say his or her name, event identifier, or the like) in order to initiate the event processing or continue the event processed (if pre-staged). The banking associate (or other entity representative) may input the user identifying information, event identifier, or the like, into an entity computing device, such as local user computing device 150, local user computing device 155, or the like, and the data may be transmitted to the user data module 112b. The user data module 112b may use the received information as input in a query to retrieve user data from, for example, database 112f. The retrieved information may include user device information (e.g., preregistered user device information), user preferences, and the like. That data may be transmitted to or otherwise used by interactive authentication module 112c.

For instance, interactive authentication module 112c may store instructions and/or data that may cause or enable the contactless processing computing platform 110 to generate an interactive authentication data request. The generated interactive authentication data request may include an interactive user interface identifying one or more particular types of authentication data. The generated interactive authentication data request may be transmitted to the preregistered user device (e.g., remote user computing device 170, remote user computing device 175, or the like) for display on a display of the device.

Contactless processing computing platform 110 may further have, store and/or include user input analysis module 112d. User input analysis module 112d may store instructions and/or data that may cause or enable the contactless processing computing platform 110 to receive authentication response data from the remote user computing device 170, remote user computing device 175, or the like, and evaluate the data to determine whether the user is authenticated. For instance, a user may provide authentication response data via the interactive authentication data request displayed on remote user computing device 170, remote user computing device 175, or the like. The authentication response data may include user input including a username and password, PIN, one-time passcode, biometric data received via one or more sensors on the remote user computing device 170, 175, or the like. The received user input may be used to generate authentication response data that may be transmitted to the user input analysis module 112d.

User input analysis module 112d may receive the authentication response data and compare it to pre-stored authentication data, pre-defined triggers, and the like. If the data matches, the user may be authenticated. If not, additional authentication data may be requested and/or the request to process the event may be denied.

Contactless processing computing platform 110 may further have, store and/or include event processing module 112e. Event processing module 112e may store instructions and/or data that may cause or enable the contactless processing computing platform 110 to execute one or more instructions or commands to process an event based on user authentication. For instance, if the user is authenticated, the event processing module 112e may execute one or more instructions or commands to process the event, such as authorizing dispensing of funds, accepting a deposit, updating one or more account ledgers, or the like. In some examples, the event processing module 112e may generate one or more commands or instructions that may be transmitted to entity computing system 120 for execution.

Database 112f may store user registration data, and/or other data associated with one or more users. The database 112f may be configured to be modified to include additional data elements upon receiving additional registration data.

FIGS. 2A-2D depict one example illustrative event sequence for implementing and using contactless authentication and event processing functions in accordance with one or more aspects described herein. The events shown in the illustrative event sequence are merely one example sequence and additional events may be added, or events may be omitted, without departing from the invention.

At step 201, registration data may be received. For instance, a user may input a request to register for contactless authentication and event processing to a user computing device (e.g., remote user computing device 170). The request to register may include registration information such as name of user, contact information of user, account information of user, device information of user, authentication information of the user, and the like. In some examples, the registration information may include one or more user preferences (e.g., customized events to use contactless processing, predetermined distress codes, or the like). In some arrangements, the registration information may include user permission for contactless processing computing platform 110 to retrieve user information (e.g., account information, authentication information, or the like) from one or more other entity systems or databases. The request for registration data and associated request to register a user may be performed at a banking center, via an online application, via an application executing on a mobile device, or the like.

At step 202, a connection may be established between the remote user computing device 170 and contactless processing computing platform 110. For instance, a first wireless connection may be established between the contactless processing computing platform 110 and remote user computing device 170. Upon establishing the first wireless connection, a communication session may be initiated between contactless processing computing platform 110 and remote user computing device 170.

At step 203, the registration data or information may be transmitted from the remote user computing device 170 to the contactless processing computing platform 110. For instance, the registration data or information may be transmitted during the communication session initiated upon establishing the first wireless connection.

At step 204, the registration data or information may be received by contactless processing computing platform 110. At step 205, a registration entry may be generated. For instance, one or more databases may be modified to add an entry (or update a previous entry) to include the registration information of the user (e.g., name, pre-stored authentication data, or the like).

At step 206, a request to process an event may be received by the contactless processing computing platform 110. In some examples, the request to process the event may be received from local user computing device 150 (e.g., a banking associate computing device) if, for instance, a user has entered a banking center to conduct or process the event, such as a transaction for withdrawal, deposit, or the like. Additionally or alternatively, the request to process the event may be received from remote user computing device 170. For instance, a user may request processing of an event via an application executing on the remote user computing device 170 (e.g., a mobile banking application), via an online application (e.g., an online banking application), or the like. In some examples, the user may be at a first location when making the request to process the event and may proceed to a second location, such as a banking center, to complete processing of the event. Additionally or alternatively, a user may request processing of an event in a first location and may remain in that location and a delivery associate may proceed to the first location to complete processing of the event. For instance, a user may request delivery of funds and a delivery associate may bring the funds to the location of the user in response.

With reference to FIG. 2B, at step 207, the requested event may be pre-staged. For instance, if a user requests event processing (e.g., via remote user computing device 170) and then plans to complete event processing at a banking center, upon delivery of funds or goods, or the like, the requested event may be pre-staged to more efficiently process the event. Pre-staging may include retrieving user account information, withdrawing funds from the account with a provisional withdrawal recorded on a ledger of the account, providing a provisional deposit of funds based on a requested deposit, or the like. In some examples, pre-staging an event may include generating a unique identifier associated with the event that may be used to complete processing, retrieve data, or the like.

In some examples, step 207 may be omitted (e.g., in examples in which a user is requesting event processing at the banking center, such as while the user is present at the banking center).

At step 208, user input including user identifying information may be received. For instance, a user may arrive at a banking center to complete processing of an event, request processing of an event, or the like. Additionally or alternatively, a delivery associate may arrive at a user location to complete processing of a requested event. The user may provide to a banking center associate, delivery associate, or the like, his or her name, identifier, an identifier associated with a pre-staged or requested event, or the like. In some examples, in order to avoid contact with any common surfaces, the user may speak his or her name, identifier, or the like, to the associate. The associate may then input the received user or event identifying information into his or her entity computing device (e.g., local user computing device 150). For instance, the local user computing device 150 may be computer terminal at a banking center operated by a banking associate, a mobile device, such as a tablet computer device, smartphone, remote terminal, or the like, carried by a delivery associate, or the like.

At step 209, a connection may be established between the local user computing device 120 and contactless processing computing platform 110. For instance, a second wireless connection may be established between the contactless processing computing platform 110 and local user computing device 150. Upon establishing the second wireless connection, a communication session may be initiated between contactless processing computing platform 110 and local user computing device 150.

At step 210, the received user identifying information may be transmitted from local user computing device 150 to contactless processing computing platform 110. For instance, the user identifying information may be transmitted during the communication session initiated upon establishing the second wireless connection.

At step 211, the user identifying information may be received and user data may be retrieved from a database based on the user identifying information. For instance, if an event is pre-staged, the event may be retrieved from a database. Additionally or alternatively, data such as pre-stored authentication data, user preferences, device data associated with a user device, such as remote user computing device 170, and the like, may be retrieved upon receiving the user identifying information.

At step 212, an interactive authentication data request may be generated. For instance, in response to receiving the user identifying information and/or retrieving event or user data, an interactive authentication data request may be generated. In some examples, the interactive authentication data request may include a user interface requesting one or more particular types of authentication data. For instance, the interactive authentication request may include a user interface requesting biometric data, such as a fingerprint or voice print, a one-time passcode that may be provided to the user, a username and password, a personal identification number, or the like.

With reference to FIG. 2C, at step 213, the generated interactive authentication data request may be transmitted from the contactless processing computing platform 110 to the remote user computing device 170. For instance, based on the user information retrieved, the contactless processing computing platform 110 may identify a pre-registered user device (e.g., remote user computing device 170) associated with the user requesting event processing and may transmit the interactive authentication data request to the identified remote user computing device 170. In some examples, the interactive authentication data request may be transmitted during the communication session initiated upon establishing the first wireless connection. In other examples, an additional wireless connection may be establishing and communication session initiated.

At step 214, the interactive authentication data request may be received by remote user computing device 170 and, at step 215, the interactive authentication data request may be displayed on a display of remote user computing device 170.

At step 216, user input including authentication response data may be received by remote user computing device 170. For instance, a user may input (e.g., via a touchscreen, keypad, sensor, or the like of the remote user computing device 170) requested authentication data such as username and password, PIN, one-time passcode, or the like. In some examples, biometric data may be input via one or more sensors associated with remote user computing device 170. Accordingly, the user may provide authentication data without contacting any public or common surfaces and, instead, may provide authentication data via his or her own personal computing device.

At step 217, the authentication response data may be transmitted from the remote user computing device 170 to the contactless processing computing platform 110. In some examples, the authentication response data may be transmitted during the communication session initiated upon establishing the first wireless connection. In other examples, an additional wireless connection may be established and communication session initiated.

At step 218, the authentication response data may be received by contactless processing computing platform 110.

Figure 2A:
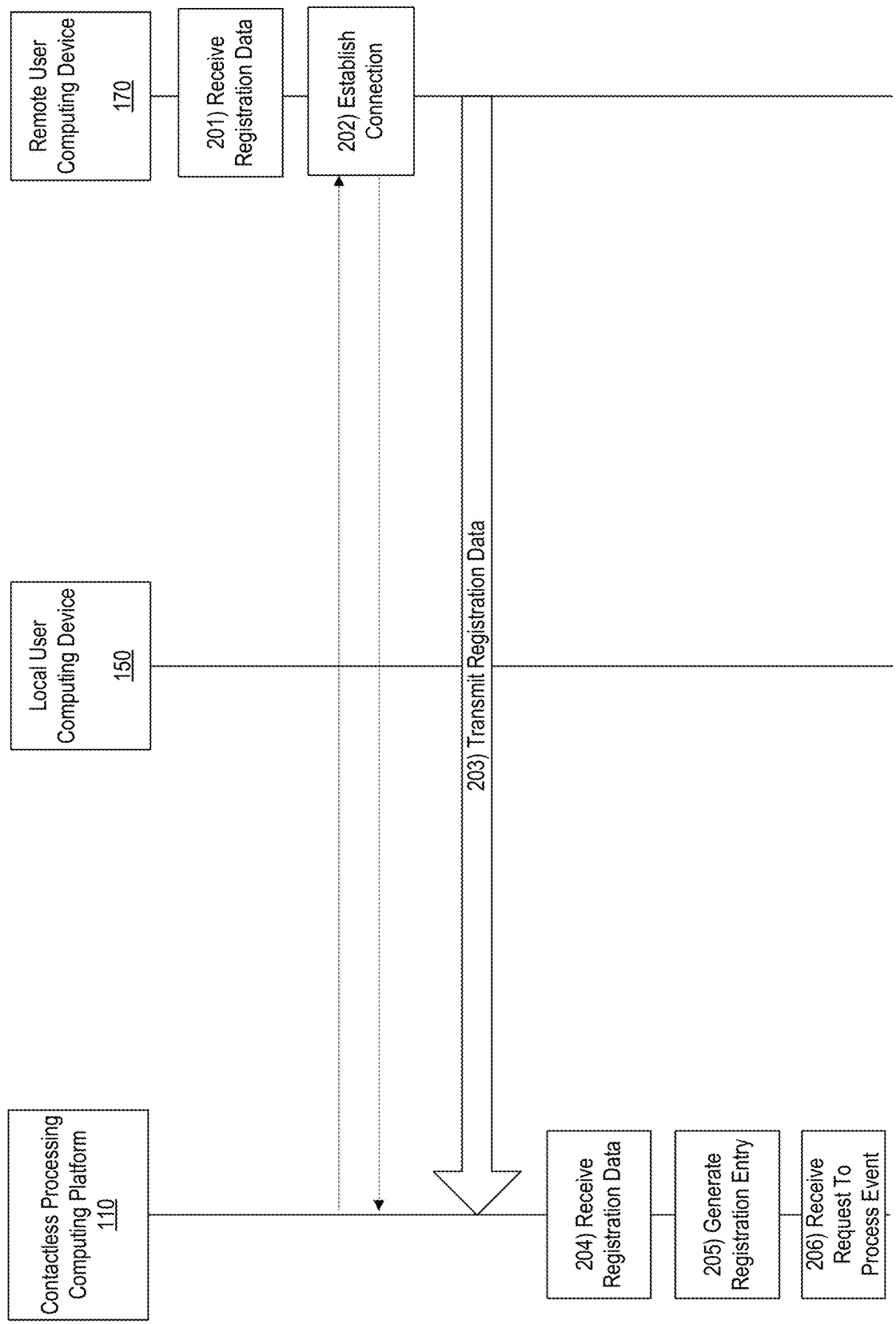
Figure 2D:
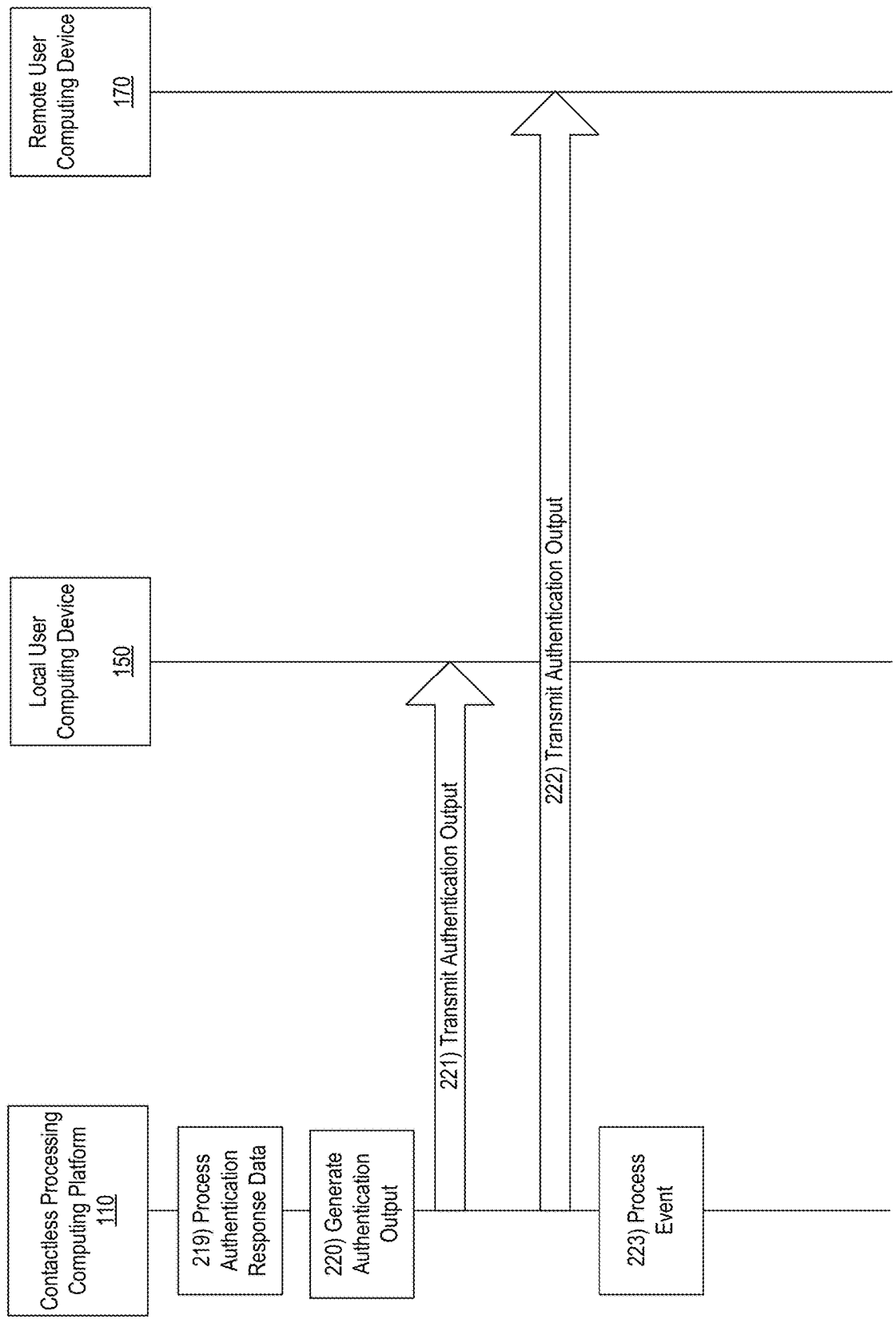

With reference to FIG. 2D, at step 219, the authentication response data may be processed by contactless processing computing platform 110. For instance, the authentication response data may be compared to pre-stored authentication data (e.g., pre-stored at, for example, a registration process and retrieved in response to receiving user authenticating information) to determine whether the authentication response data matches the pre-stored data.

In some examples, processing the authentication response data may further include evaluating the authentication response data for one or more triggers. For instance, in some examples, a user may elect to have additional security associated with the authentication process. For instance, a user may designate (e.g., via a registration process, in updating user preferences, or the like) that he or she would like a duress code or character. Accordingly, a user may select or be assigned (e.g., by contactless processing computing platform 110 a particular character or code that may be used to indicate when a user is operating under duress. Accordingly, the user may insert the duress character or code in the authentication response data (e.g., anywhere in the data, in a predetermined position, or the like) as an indication that the user is operating under duress and additional measures should be initiated. For instance, the user may include an extra character in a response to a request for authentication data (e.g., PIN may include 5 digits instead of 4). In another example, the user may preselect the letter "A" as an indication of duress. Accordingly, if the user returns, for example, a requested one-time passcode with an A at an end (or in any position), the system may detect the trigger and execute functions for duress. Various other arrangements of duress codes may be used without departing from the invention.

Accordingly, processing the authentication response data may include evaluating the response data to determine whether a duress code is present. If not, the system may proceed. If so, the system may initiate one or more actions such as requesting additional authentication data, contacting law enforcement, or the like).

At step 220, an authentication output may be generated. For instance, based on the comparing of the authentication response data to pre-stored authentication data, evaluation for one or more triggers, and the like, an authentication output may be generated. The authentication output may include a user interface indicating an output of the processing of the authentication response data. For instance, if no trigger is detected and the authentication response data matches pre-stored authentication data, the authentication output may include an indication that the user is authenticated and the event is authorized for processing. If authentication data does not match pre-stored data, the authentication output may indicate that the user is not authenticated, that the event is denied processing, may request additional authentication information, or the like. If a trigger is detected, the authentication output may include an indication that an error has occurred, that the requested event will not be processed, or the like.

In some examples, one authentication output may be generated for presentation to a banking associate (e.g., via local user computing device 150) and a different authentication output may be generated for presentation to the user (e.g., via remote user computing device 170). For instance, if a trigger is detected, a first user interface indicating that a duress signal was detected may be generate for presentation to the banking associate and a second, different user interface indicating that, for example, an error has occurred and the event will not be processed, may be generated for presentation to the user.

At step 221, the authentication output may be transmitted from the contactless processing computing platform 110 to local user computing device 150. In some examples, the authentication output may be transmitted during the communication session initiated upon establishing the second wireless connection. Additionally or alternatively, another wireless communication session may be established and communication session initiated. The authentication output may then be displayed by a display of the local user computing device 150.

At step 222, the authentication output may be transmitted from the contactless processing computing platform 110 to remote user computing device 170. In some examples, the authentication output may be transmitted during the communication session initiated upon establishing the first wireless connection. Additionally or alternatively, another wireless communication session may be established and communication session initiated. The authentication output may then be displayed by a display of the remote user computing device 170.

At step 223, if the user is authenticated and no triggers are detected, the event may be authorized for processing. In some examples, contactless processing computing platform 110 may process the event by executing one or more functions to complete processing of the event, such as dispensing funds, updating an account ledger of the user, processing a deposit, or the like. In examples in which provisional withdrawals or deposits were debited or credited from the user's account, those withdrawals or deposits may be processed to provide a full debit or credit rather than just provisional debit or credit.

FIG. 3 is a flow chart illustrating one example method of implementing contactless authentication and event processing functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, registration data may be received from a user. For instance, a user may request to register for contactless authentication and event processing. In some examples, the registration information may include user identifying information (e.g., name, contact information, username, password, personal identification number (PIN), or the like), data associated with one or more user computing devices (e.g., remote user computing device 170), user account data, and the like. Registration data may also include user preferences, such as when and if to enable contactless processing, whether a user has identified triggers, associated trigger characters or codes, and the like. A user may request registration upon opening an account or after an account has been opened. In some examples, a user may request registration at a banking center, via a mobile banking application executing on a user computing device, via an online banking application, or the like.

At step 302, a request to process an event, such as a transaction, may be received. In some examples, the event may include a withdrawal of funds, a deposit, or the like. Additionally or alternatively, the event may include delivery (and any associated financial processing associated with delivery, such as payment for products or services, and the like) of one or more items, including funds (e.g., domestic currency), foreign currency, a purchased product or service, or the like. The request to process the event may be received from a user computing device, such as remote user computing device 170 or from a computing device associated with the entity or enterprise organizing implementing the contactless processing computing platform, such as local user computing device 150.

At step 304, user identifying information may be received. For instance, a user may provide to an associate, such as a banking associate, delivery associate, or the like, user identifying information such as a name, unique identifier, identifier associated with the event being processed, or the like. In some examples, the user may speak the user identifying information to the associate who may input the user identifying information into his or her local user computing device 150, which may then be transmitted to contactless processing computing platform 110 for processing.

At step 306, in response to receiving the user identifying information, additional user data may be retrieved. For instance, user data stored or otherwise captured upon registration, or the like, may be retrieved from one or more databases. In some examples, data such as user device data (e.g., data identifying remote user computing device 170), user authentication data, user account data, and the like may be retrieved.

At step 308, responsive to retrieving the user data, an interactive authentication data request may be generated and/or transmitted. For instance, an interactive authentication data request including a request for one or more types of authentication data may be generated and transmitted to the user computing device (e.g., remote user computing device 170). For instance, the interactive authentication request may be generated based on the retrieved data and transmitted to the user computing device identified from the retrieved data.

At step 310, authentication response data may be received from the user. For instance, the authentication response data may include authentication response data provided by the user via the remote user computing device 170 and transmitted to the contactless processing computing platform 110. The authentication response data may include data responsive to the authentication data requested in the interactive authentication request.

At step 312, the authentication response data may be evaluated. For instance, the authentication response data may be evaluated to determine whether it includes one or more triggers, whether it matches pre-stored authentication data (e.g., from retrieved user data), and the like.

At step 314, a determination may be made as to whether, based on the evaluation of the authentication response data, a trigger was detected in the authentication response data. For instance, the contactless processing computing platform 110 may determine whether a duress character or code was detected in the authentication response data. If so, one or more duress functions may be executed at step 316. For instance, the contactless processing computing platform 110 may generate and transmit a notification to a banking or delivery associate indicating the user is potentially acting under duress, contact law enforcement, generate and transmit one or more notifications or outputs, and the like.

If, at step 314, a trigger is not detected, the contactless processing computing platform 110 may determine whether, based on the evaluation of the authentication response data, a match exists between the authentication response data and the pre-stored authentication data at step 318.

If not, an output indicating the request for event processing has been denied may be generated at step 320. Additionally or alternatively, at step 320, a request for additional authentication data may be generated and transmitted to a user or presented to a user via a banking associate (e.g., request to display driver's license or other photo identification, or the like).

If, at step 318, a match exists, one or more outputs indicating that the user is authenticated may be generated and transmitted to local user computing device 150, remote user computing device 170, and the like, at step 322. At step 324, based on the authentication of the user, the event may be processed. In some examples, processing the event may include executing functions associated with the event (e.g., dispensing funds, transferring funds to user, or the like). Additionally or alternatively, processing the event may include generating and transmitting one or more instructions to commands to other entity devices or systems, such as entity computing system 120, causing entity computing system 120 to execute one or more functions (e.g., updating a ledger, dispensing funds, or the like).

Figure 4:
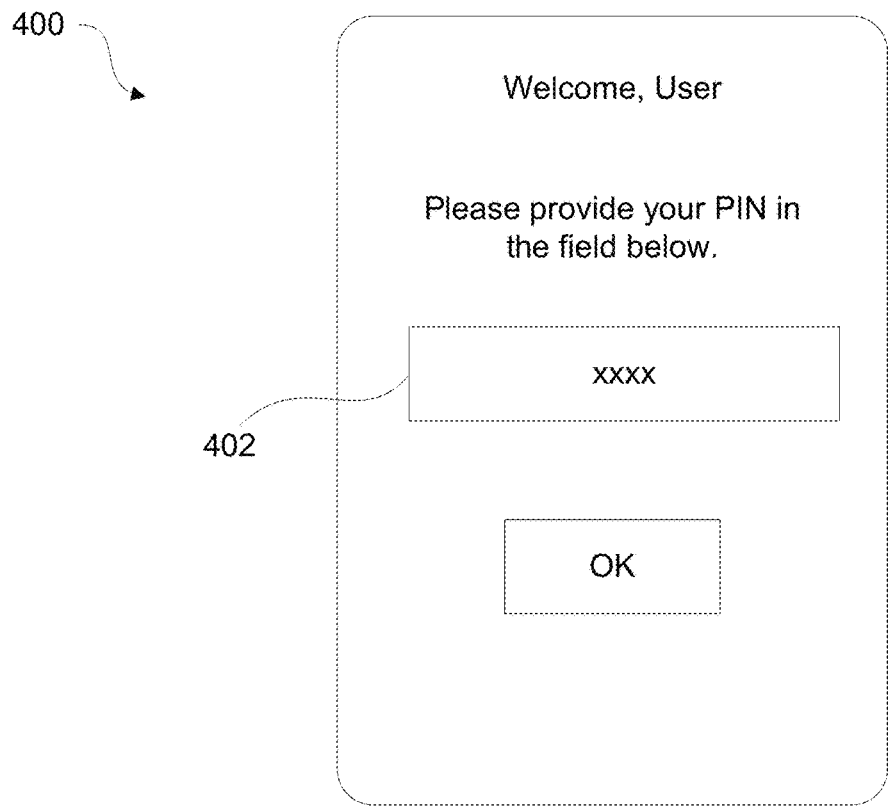
FIG. 4 illustrates one example interactive authentication data request that may be generated in accordance with one or more aspects described herein.

FIG. 4 illustrates one example interactive authentication data request that may be transmitted to a remote user computing device in accordance with one or more aspects described herein. The interactive authentication data request 400 may include an identification of the user requesting processing of the event. Further, the interactive authentication request 400 may include a type of authentication requested and a field 402 in which the user may input the requested authentication data. As discussed herein, authentication data may include username and password, PIN, one-time passcode, biometric data, and the like. Upon inputting the requested authentication data, the user may select "OK" option and the authentication response data may be transmitted to the contactless processing computing platform 110 for processing.

Figure 5:
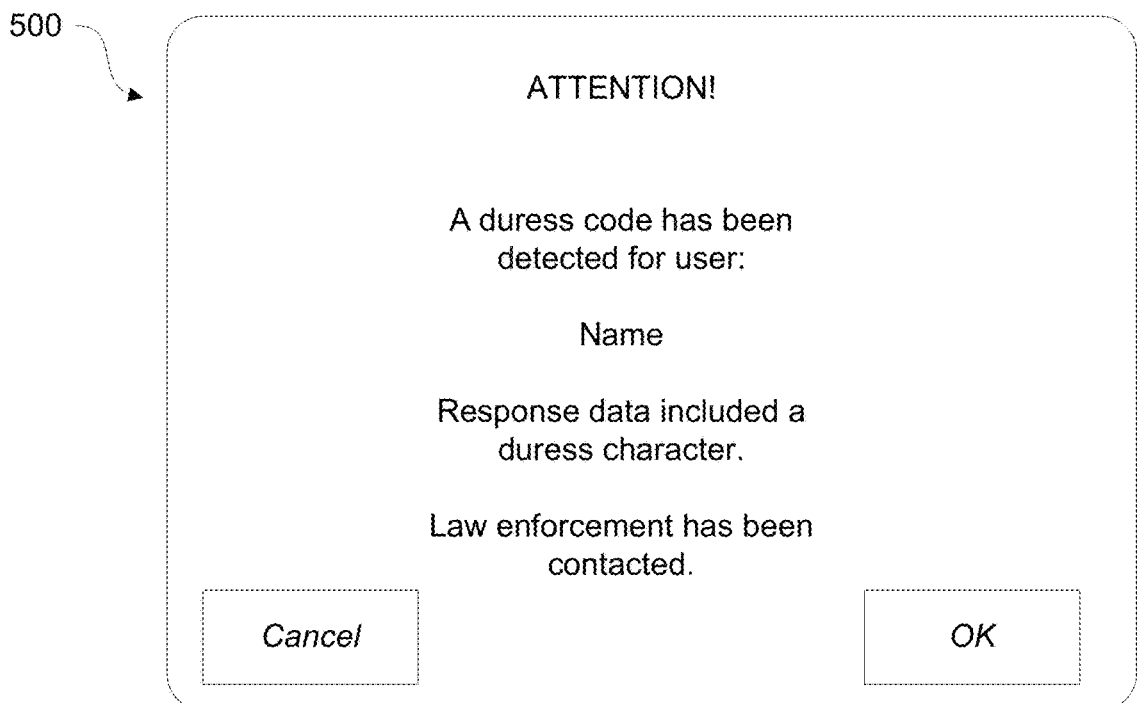
FIG. 5 illustrates one example notification that may be generated and transmitted in accordance with one or more aspects described herein.

FIG. 5 illustrates one example notification that may be transmitted to a local user computing device indicating that a duress trigger has been detected. The notification 500 includes an indication of the user to whom the notification applies, as well as one or more actions that may have been initiated based on the detected trigger. For instance, if law enforcement has been notified, the notification 500 may include that indication. Accordingly, if the user is at the banking center with the banking associate, the banking associate may be aware of the situation and may aid the user (e.g., wait until law enforcement arrives, or the like).

Figure 6:
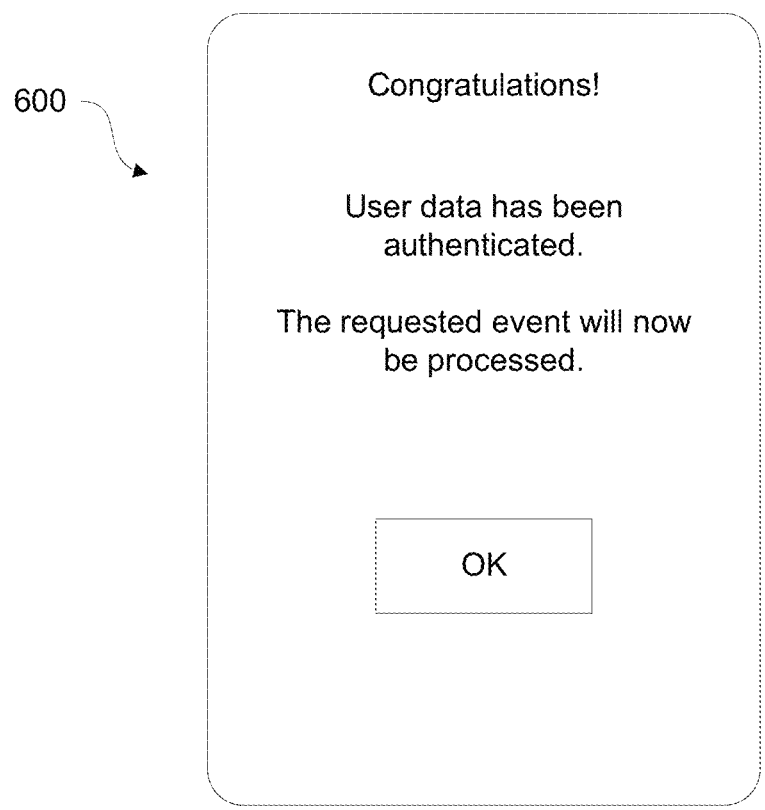
FIG. 6 illustrates one example authentication output that may be generated in accordance with one or more aspects described herein.

FIG. 6 indicates one example authentication output that may be transmitted to one or more of local user computing device 150, remote user computing device 170, or the like. The authentication output 600 includes an indication that the user has been authenticated and that the requested event will be processed.

As discussed, aspects described herein are directed to enhanced authentication processes that reduce or eliminate contact with one or more public or common surfaces or devices. By using a computing device of a user to provide authentication and event processing information, rather than common or public devices, user contact with common surfaces may be minimized.

As discussed herein, the arrangements described may be used when requesting an event (e.g., at a banking location, or the like) or with pre-staged events (e.g., a financial transaction requested via a mobile application and completed at the banking center, a purchase with delivery, or the like). This may also aid in reducing an amount of time the user is in a public space. In some examples, the user may be authenticated upon pre-staging the event and then re-authenticated upon requesting completion of processing the event.

Although various aspects described herein are directed to requesting authentication information such as a username and password, PIN, biometric data, or the like, various other modes of authentication may also be used without departing from the invention. For instance, if a product or service is being provided via a delivery person, a user interface may be transmitted to user computing device (e.g., remote user computing device 170) that may cause the user's screen to appear with a color, patterns, sequence of characters, or the like. Upon arrival of the delivery associate, he or she may display his or her device (e.g., local user computing device 150) and the user may display her or her computing device (e.g., remote user computing device 170) to determine whether the color, pattern, sequence, or the like matches. If so, the user may be authenticated and the event processed. If not, the event may be denied, additional authentication information may be requested, or the like. These arrangements may also provide additional security to the user to confirm that the delivery person is an authorized actor (e.g., rather than an unauthorized actor).

Similarly, these arrangements of transmitting and displaying a particular interface on the user computing device may be used for banking associate events, and the like. For instance, upon receiving user identifying information, the contactless processing computing platform may generate and transmit a user interface including the display of color, pattern, sequence, or the like, and may transmit it to the user device. The user device may display the interface and may present the displayed interface to the banking associate as a form of authentication.

In some examples, the type of authentication may be dynamic or may change dynamically. For instance, a first event processing may include a request for biometric authentication data and a next event processing may include input of a one-time passcode. In some arrangements, the type of authentication requested may dynamically change with each requested event.

In some examples, the user may also identify one or more preferences associated with limits on types of events for processing, amount of event for processing, and the like. These limits may be retrieved with retrieval of user data and executed for each event processing.

As discussed herein, various aspects may be used to enable a user to trigger additional aid. For example, a duress code may be used to indicate that the user is not acting of his or her own free will and needs assistance. As discussed herein, the duress code may include an additional character or digit on a password, PIN, one-time passcode, or the like, may include a particular character or digital or a particular placement in a string of characters or digits, input of a pre-defined password that is incorrect but has been pre-registered as an indication of duress, or the like. Detection of the duress code or other trigger may cause execution of one or more functions, such as contacting law enforcement, notifying a delivery of banking associate, and the like.

While many of these arrangements are described in use at a particular location (e.g., banking location, retail location, or the like) or with delivery, arrangements discussed herein may also be used at a self-service kiosk, such as an automated teller machine (ATM), automated teller assistant (ATA), or the like. In some examples, detection of a trigger, such as a duress code, may cause one or more additional sensors or cameras at the self-service kiosk to begin recording, may cause image or other sensor data for a predetermined time before the trigger was detected to a predetermined time after the trigger was detected to be stored, or the like.

In some examples, multi-factor authentication may also be enabled or used with one or more arrangements discussed herein. For instance, if a user is requesting to process an event that is unusual for the user (e.g., a greater amount of withdrawal than considered a normal withdrawal for this user, a wire transfer when the user has never used wire transfer, a request for event processing at a location that is not a typical location for the user, or the like) multi-factor authentication may be enabled. Accordingly, the user may be requested to provide multiple forms of authentication data, use multiple devices to authenticate, or the like.

In some arrangements, aspects discussed herein may be used to permit processing of events when, for instance, a user has forgotten identification, is at a self-service kiosk but does not have his or her debit or ATM card, or the like. The system may generate an interactive authentication data request that may be transmitted to the user computing device. The authentication response data may be evaluated and the user may be authenticated if the data matches and may access the functionality desired.

Aspects described herein may also be used to track effectiveness and use of the contactless authentication and event processing arrangements described herein. For instance, data related to use of the arrangements, whether any errors occurred in authenticating a user, whether triggers are used effectively, or the like, may be captured and displayed (e.g., via one or more reports, graphs, or the like). This data may then be used to modify or improve the arrangements discussed herein.

Figure 7:
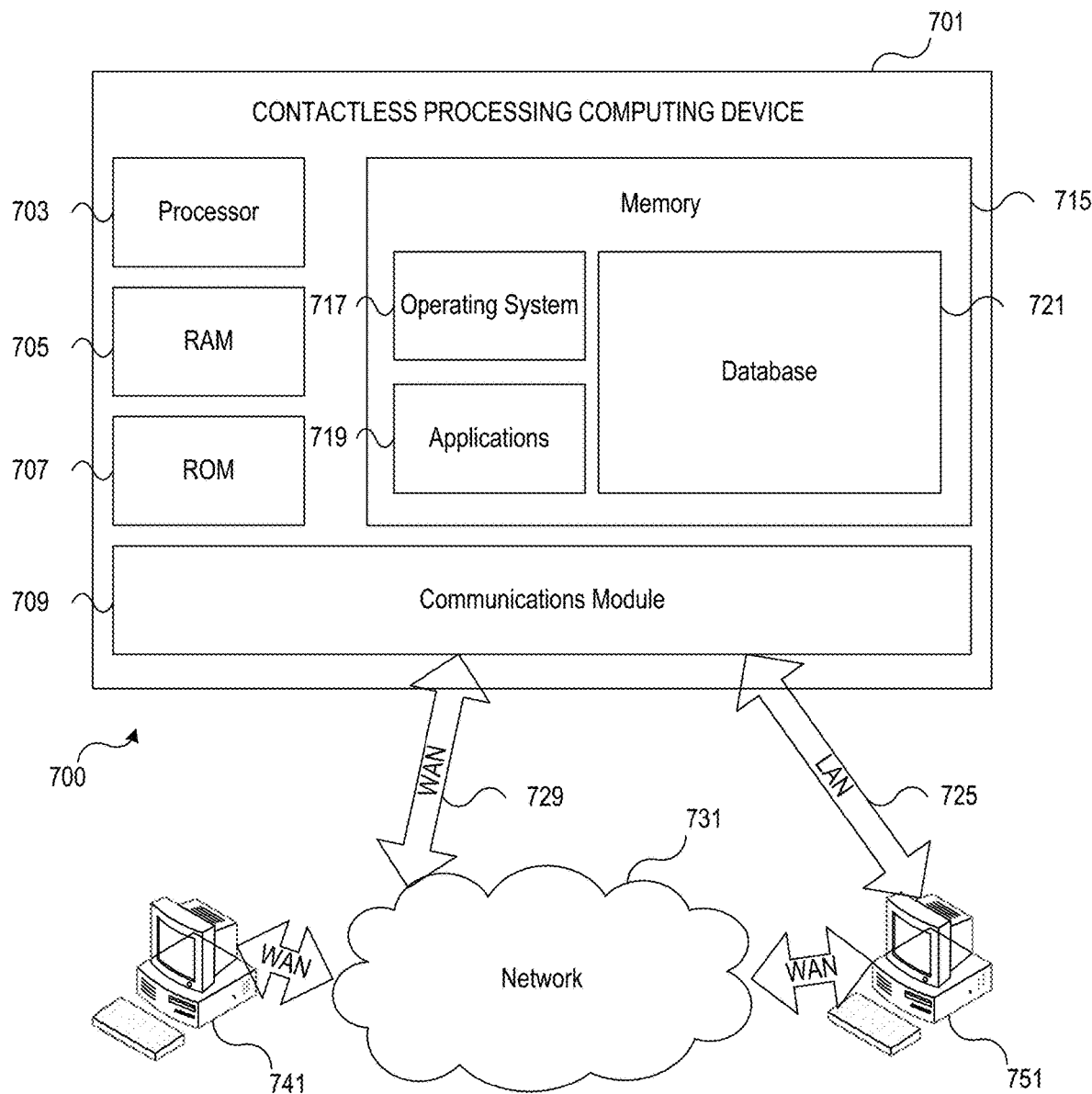
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include contactless processing computing device 701 having processor 703 for controlling overall operation of contactless processing computing device 701 and its associated components, including Random Access Memory (RAM) 705, Read-Only Memory (ROM) 707, communications module 709, and memory 715. Contactless processing computing device 701 may include a variety of computer readable media. Computer readable media may be any available media that may be accessed by contactless processing computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by contactless processing computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on contactless processing computing device 701. Such a processor may execute computer-executable instructions stored on a computer-readable medium.

Software may be stored within memory 715 and/or storage to provide instructions to processor 703 for enabling contactless processing computing device 701 to perform various functions as discussed herein. For example, memory 715 may store software used by contactless processing computing device 701, such as operating system 717, application programs 719, and associated database 721. Also, some or all of the computer executable instructions for contactless processing computing device 701 may be embodied in hardware or firmware. Although not shown, RAM 705 may include one or more applications representing the application data stored in RAM 705 while contactless processing computing device 701 is on and corresponding software applications (e.g., software tasks) are running on contactless processing computing device 701.

Communications module 709 may include a microphone, keypad, touch screen, and/or stylus through which a user of contactless processing computing device 701 may provide input, and may also include one or more of a speaker for providing audio output and a video display device for providing textual, audiovisual and/or graphical output. Computing system environment 700 may also include optical scanners (not shown).

Contactless processing computing device 701 may operate in a networked environment supporting connections to one or more remote computing devices, such as computing devices 741 and 751. Computing devices 741 and 751 may be personal computing devices or servers that include any or all of the elements described above relative to contactless processing computing device 701.

The network connections depicted in FIG. 7 may include Local Area Network (LAN) 725 and Wide Area Network (WAN) 729, as well as other networks. When used in a LAN networking environment, contactless processing computing device 701 may be connected to LAN 725 through a network interface or adapter in communications module 709. When used in a WAN networking environment, contactless processing computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 8:
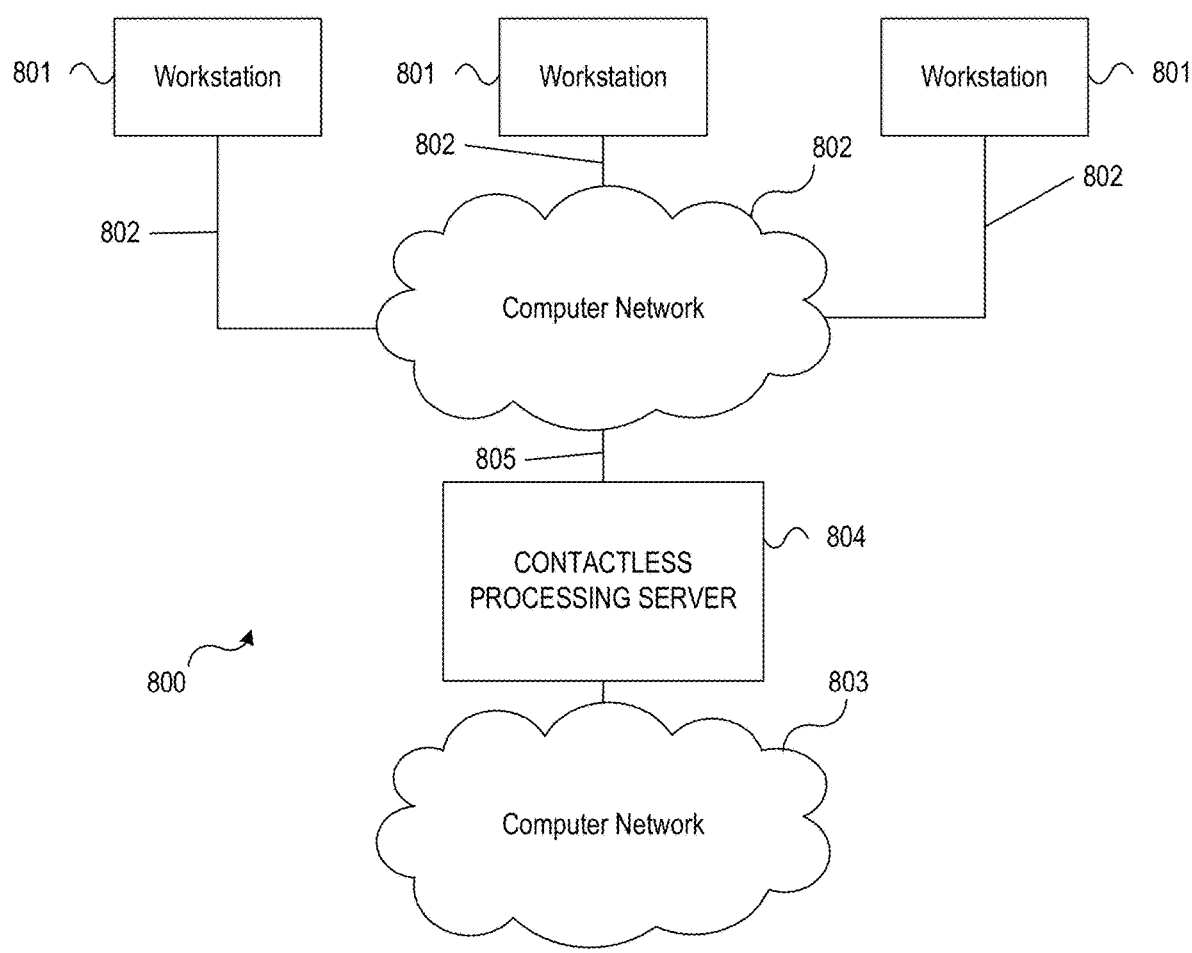
FIG. 8 depicts an illustrative block diagram of workstations and servers that may be used to implement the processes and functions of certain aspects of the present disclosure in accordance with one or more aspects described herein.

FIG. 8 depicts an illustrative block diagram of workstations and servers that may be used to implement the processes and functions of certain aspects of the present disclosure in accordance with one or more example embodiments. Referring to FIG. 8, illustrative system 800 may be used for implementing example embodiments according to the present disclosure. As illustrated, system 800 may include one or more workstation computers 801. Workstation 801 may be, for example, a desktop computer, a smartphone, a wireless device, a tablet computer, a laptop computer, and the like, configured to perform various processes described herein. Workstations 801 may be local or remote, and may be connected by one of communications links 802 to computer network 803 that is linked via communications link 805 to contactless processing server 804. In system 800, contactless processing server 804 may be a server, processor, computer, or data processing device, or combination of the same, configured to perform the functions and/or processes described herein. Server 804 may be used to receive a request to process an event, receiving user identifying information, retrieve user data, generate an interactive authentication data request, receive user authentication response data, compare authentication response data to user data, generate one or more authentication outputs, and the like.

Computer network 803 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 802 and 805 may be communications links suitable for communicating between workstations 801 and contactless processing server 804, such as network links, dial-up links, wireless links, hardwired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform associated with an enterprise organization, comprising:
   at least one processor;
   a communication interface communicatively coupled to the at least one processor; and
   a memory storing computer-readable instructions that, when executed by the at least one processor, cause the computing platform to:
      receive a request to process an event;
      receive, from a first computing device, user identifying data of a user wherein the first computing device is a computing device associated with an enterprise organization associate;
      responsive to receiving the user identifying data from the first computing device, retrieve, from a database, user data and user computing device data associated with the user, the user computing device being a pre-registered device that is different from the first computing device;
      generate, based on the user data, an interactive authentication data request;
      transmit the generated interactive authentication data request to the user computing device;
      receive, from the user computing device, authentication response data;
      compare the authentication response data to pre-stored authentication data of the user from the user data;
      responsive to determining, based on the comparing, that the authentication response data matches the pre-stored authentication data:
         authenticating the user;
         generating a first authentication output;
         transmitting the first authentication output to at least one of: the first computing device and the user computing device; and
         processing the requested event; and
      responsive to determining, based on the comparing, that the authentication response data does not match the pre-stored authentication data:
         denying the request to process the event;
         generating a second authentication output different from the first authentication output; and
         transmitting the second authentication output to at least one of: the first computing device and the user computing device.

2. The computing platform of claim 1, wherein the user identifying data of the user is received via user input provided by a user other than the user.

3. The computing platform of claim 1, wherein the user data and user computing device data are captured during a registration process before receiving the request to process the event.

4. The computing platform of claim 1, wherein the interactive authentication data request includes a request for at least one of: a username and password, one-time passcode, personal identification number, or biometric data.

5. The computing platform of claim 1, further including instructions that, when executed, cause the computing platform to:
   responsive to receiving the authentication response data, analyze the authentication response data to determine whether it includes a trigger.

6. The computing platform of claim 5, further including instructions that, when executed, cause the computing platform to:
   responsive to determining that the authentication response data includes a trigger, executing one or more duress functions before comparing the authentication response data to the pre-stored authentication data; and
   responsive to determining that the authentication response data does not include a trigger, comparing the authentication response data to the pre-stored authentication data.

7. The computing platform of claim 5, wherein the trigger includes at least one of: a presence of a predefined duress character in the authentication response data or an additional character in the authentication response data.

8. A method, comprising:
   receiving, by a computing platform associated with an enterprise organization, the computing platform having at least one processor, memory and communication interface, a request to process an event;
   receiving, by the at least one processor and from a first computing device, user identifying data of a user, wherein the first computing device is a computing device associated with an enterprise organization associate;
   responsive to receiving the user identifying data from the first computing device, retrieving, by the at least one processor and from a database, user data and user computing device data associated with the user, the user computing device being a pre-registered device that is different from the first computing device;

generating, by the at least one processor and based on the user data, an interactive authentication data request;

transmitting, by the at least one processor, the generated interactive authentication data request to the user computing device;

receiving, by the at least one processor and from the user computing device, authentication response data;

comparing, by the at least one processor, the authentication response data to pre-stored authentication data of the user from the user data;

when it is determined, based on the comparing, that the authentication response data matches the pre-stored authentication data:
  authenticating, by the at least one processor, the user;
  generating, by the at least one processor, a first authentication output;
  transmitting, by the at least one processor, the first authentication output to at least one of: the first computing device and the user computing device; and
  processing, by the at least one processor, the requested event; and when it is determined, based on the comparing, that the authentication response data does not match the pre-stored authentication data:
  denying, by the at least one processor, the request to process the event;
  generating, by the at least one processor, a second authentication output different from the first authentication output; and
  transmitting, by the at least one processor, the second authentication output to at least one of: the first computing device and the user computing device.

9. The method of claim 8, wherein the user identifying data of the user is received via user input provided by a user other than the user.

10. The method of claim 8, wherein the user data and user computing device data are captured during a registration process before receiving the request to process the event.

11. The method of claim 8, wherein the interactive authentication data request includes a request for at least one of: a username and password, one-time passcode, personal identification number, or biometric data.

12. The method of claim 8, further including:
  prior to comparing the authentication response data to the pre-stored authentication data and responsive to receiving the authentication response data, analyzing, by the at least one processor, the authentication response data to determine whether it includes a trigger.

13. The method of claim 12, further:
  when it is determined that the authentication response data includes a trigger, executing, by the at least one processor, one or more duress functions before comparing the authentication response data to the pre-stored authentication data; and
  when it is determined that the authentication response data does not include a trigger, comparing, by the at least one processor, the authentication response data to the pre-stored authentication data.

14. The method of claim 12, wherein the trigger includes at least one of: a presence of a predefined duress character in the authentication response data or an additional character in the authentication response data.

15. One or more non-transitory computer-readable media storing instructions that, when executed by a computing platform associated with an enterprise organization, the computing platform comprising at least one processor, memory, and a communication interface, cause the computing platform to:
  receive a request to process an event;
  receive, from a first computing device, user identifying data of a user, wherein the first computing device is a computing device associated with an enterprise organization associate;
  responsive to receiving the user identifying data from the first computing device, retrieve, from a database, user data and user computing device data associated with the user, the user computing device being a pre-registered device that is different from the first computing device;
  generate, based on the user data, an interactive authentication data request;
  transmit the generated interactive authentication data request to the user computing device;
  receive, from the user computing device, authentication response data;
  compare the authentication response data to pre-stored authentication data of the user from the user data;
  responsive to determining, based on the comparing, that the authentication response data matches the pre-stored authentication data:
    authenticating the user;
    generating a first authentication output;
    transmitting the first authentication output to at least one of: the first computing device and the user computing device; and
    processing the requested event; and
  responsive to determining, based on the comparing, that the authentication response data does not match the pre-stored authentication data:
    denying the request to process the event;
    generating a second authentication output different from the first authentication output; and
    transmitting the second authentication output to at least one of: the first computing device and the user computing device.

16. The one or more non-transitory computer-readable media of claim 15, wherein the user identifying data of the user is received via user input provided by a user other than the user.

17. The one or more non-transitory computer-readable media of claim 15, wherein the user data and user computing device data are captured during a registration process before receiving the request to process the event.

18. The one or more non-transitory computer-readable media of claim 15, wherein the interactive authentication data request includes a request for at least one of: a username and password, one-time passcode, personal identification number, or biometric data.

19. The one or more non-transitory computer-readable media of claim 15, further including instructions that, when executed, cause the computing platform to:
  responsive to receiving the authentication response data, analyze the authentication response data to determine whether it includes a trigger.

20. The one or more non-transitory computer-readable media of claim 19, further including instructions that, when executed, cause the computing platform to:
  responsive to determining that the authentication response data includes a trigger, executing one or more duress functions before comparing the authentication response data to the pre-stored authentication data; and responsive to determining that the authentication response data does not include a trigger, comparing the authentication response data to the pre-stored authentication data.

21. The one or more non-transitory computer-readable media of claim 19, wherein the trigger includes at least one of: a presence of a predefined duress character in the authentication response data or an additional character in the authentication response data.

* * * * *